June 20, 1961     C. W. ZIMMERMAN     2,989,046
METHOD FOR DRILLING FINISHED HOLES IN GLASS
Filed June 5, 1958     2 Sheets—Sheet 1

INVENTOR.
CHARLES W. ZIMMERMAN
BY
ATTORNEY

United States Patent Office 2,989,046
Patented June 20, 1961

2,989,046
METHOD FOR DRILLING FINISHED HOLES IN GLASS
Charles W. Zimmerman, Bloomfield, N.J., assignor to Paramount Pictures Corporation, New York, N.Y., a corporation of New York
Filed June 5, 1958, Ser. No. 740,049
5 Claims. (Cl. 125—20)

This invention relates to a process for drilling holes in glass and is particularly directed to a process for allowing holes to be drilled in curved or flat glass without chipping or cracking of the glass in the area or vicinity about the hole.

There are several methods for developing holes in glass such as the heat pressure method wherein heat is applied to the area where the hole is to be located and the hole subsequently punched or forced out by the insertion, under pressure, of a tool or punch having the size and shape of the desired hole. This technique does not lend itself to the development of holes which are accurately and truly aligned.

Another method for forming holes in glass is drilling the glass with a diamond or brass core drill and washing and cooling the drilling surface with a carborundum slurry. These methods cause chipping and cracking in the area of the hole about the periphery thereof. In this particular method however attempts have been made to prevent chipping and cracking. This has been accomplished by using a backing such as sheet glass, hard rubber and the like in the vicinity of the hole opposite the surface of drilling. These methods for preventing chipping and cracking, although having some measure of success on flat plate glass, are completely inadequate for curved glass surfaces and other surfaces which are not planar such as the type generally used for television glass tubes or bulbs and the like. Further, where the glass must be thermally cycled after drilling or when appearance is a factor, chipping or breakout cannot possibly be tolerated.

The present invention contemplates overcoming these objectionable features by utilizing a process which provides for drilling all but the last fraction of an inch of the hole by conventional means. The next step is the covering of all of the area directly under the hole, with a plastic resin or rubber compound for protecting the glass in proximity to the hole to prevent it from becoming scratched or otherwise contaminated. In the immediate area of the hole and behind same a template of hardened steel or some other durable metal is placed the template having an aperture the size of the hole to be drilled or formed and aligned therewith when temporarily secured. Finally the area under the hole is sand blasted by a sandblasting tool or gun. The area under the hole is the point of concentration where the sandblasting operation takes place until the hole is formed free of any chipping or cracking in the area in proximity thereof.

It is therefore one object of the invention to provide an improved method for drilling holes in glass.

Another object of the invention is to provide a method for drilling holes in glass which eliminates cracking and chipping in the area about the hole.

Another object of the invention is to provide a method for drilling holes in glass which is efficient, economical, saves time and produces a clean hole which may be thermally cycled without cracking of the glass.

A still further object of the invention is to provide a method for precision drilling of holes in glass.

Other objects and advantages will become apparent from a study of the specifications and the accompanying drawings wherein.

Figure 1:
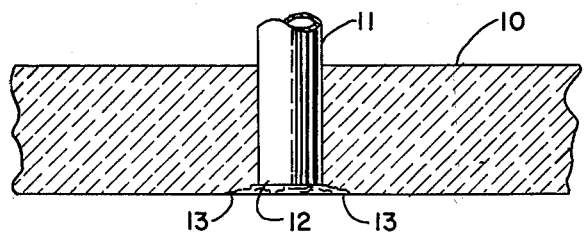
FIG. 1 shows in section a hole partially drilled in glass plate with cracking formations established thereon.
Figure 2:
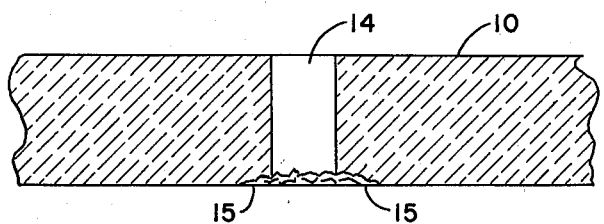
FIGURE 2 shows in section a hole completely drilled through the glass plate with cracking formations about the hole.

Now referring to the drawings and particularly to FIGURES 1 and 2 there is shown a glass panel 10 having any surface configuration such as curved or flat. The glass panel in effect is representative of any article such as the bulb or face plate panel of a cathode ray tube and the like and which requires precise and accurate holes drilled therein. In general such glass panels are normally drilled by means of a core drill 11 having diamond, brass or other types of abrasive cutting edges 12 generally used for negotiating and cutting glass such as the glass panel 10 with a carborundum slurry applied at the cutting surface for cooling purposes. Prior to the complete penetration of the core drill 11 through the glass panel 10, crack formations begin to develop at the lower portion 13 of the glass panel. Upon completion of the hole 14, as shown in FIGURE 2, the cracking formations 13 in FIGURE 1 become fully chipped and cracked so that the edge about the hole looks ragged and irregular. This condition cannot be tolerated where the glass must be thermally cycled or where appearance is an important factor. To overcome this objectionable effect, a method of drilling holes in glass is provided, according to the invention embodied herein and shown in FIGURE 3.

Figure 3:
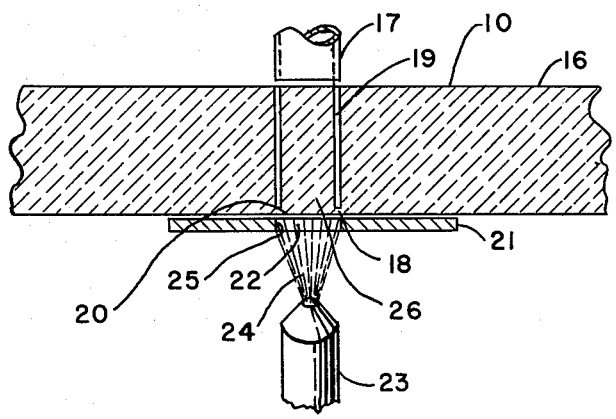
FIGURE 3 shows a hole partially drilled through the glass plate with an apertured mask on the undrilled side and sandblasting therethrough to form the hole according to the invention.
Figure 4:
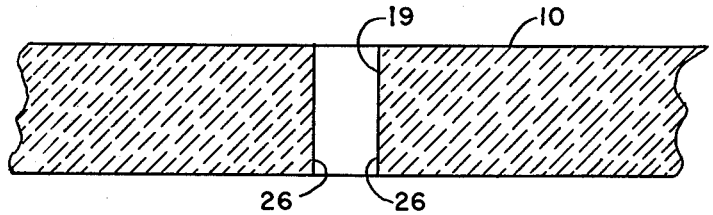
FIGURE 4 shows a hole completely drilled through the glass plate with no cracking or chipping about the hole.

In FIGURE 3 a glass panel 16 is drilled, by means of a core drill 17, partially through the panel so that there remains some finite thickness 18 between the hole 19 already drilled and the lower surface 20 of the panel. This thickness of the glass which still remains in the vicinity of the hole is generally of the order of 1/32 of an inch, but in any event is not less than that value which would cause cracking and breaking in the area about the hole. A metal backing or template 21, having the same surface contours as the glass surface 20 about the area of the hole, is placed upon the said surface and held in abutment therewith. The said backing 21 has an aperture 22 of the same diameter of the hole to be drilled and is placed in axial alignment therewith when the backing is attached or otherwise secured to the glass surface. It is preferable during the sandblasting operation to circumferentially move the sandblast gun 23 so as to concentrate the blast 24 about the peripheral edges 25 of the template aperture 22 and in the area of the drilled bore or hole 19 rather than the center 26 of the bore. In this manner of sandblasting there is no chipping or cracking about the edges. FIGURE 4 shows the finished hole 19 devoid of any cracks or chipping about the hole edges 26 and which represents a clean finished symmetrical appearance not otherwise obtainable with prior techniques.

Figure 5:
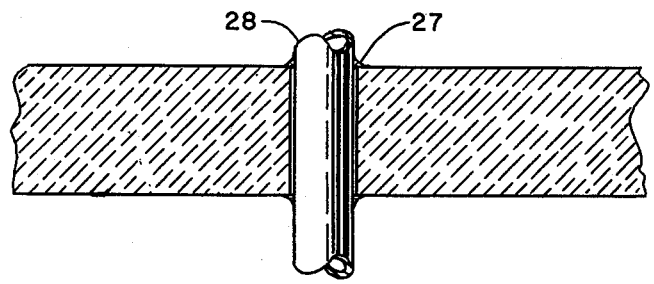
FIGURE 5 shows a fillet about the drilled hole giving support to a structural member.
Figure 6:
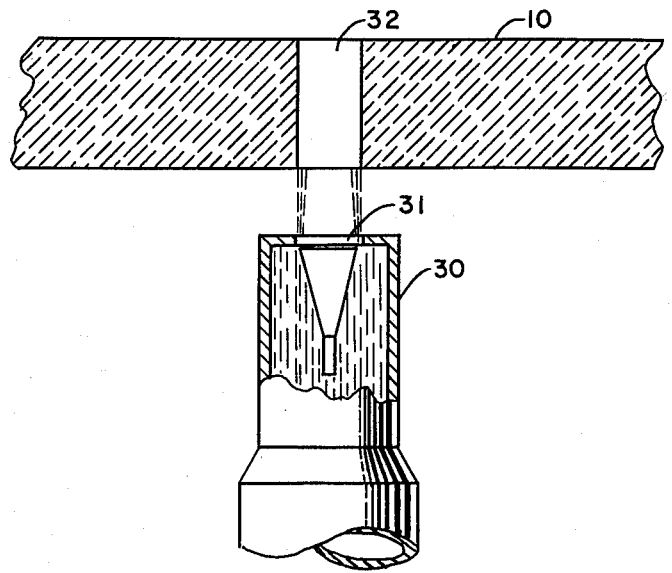
FIGURE 6 shows a fixed sandblast nozzle with a formed end for producing the hole according to the invention.

It must also be appreciated that where clean holes are made it becomes possible to create a fillet 27 about the peripheral edges of the hole as shown in FIGURE 5, which ably supports a structural member 28 when placed through the drilled hole. Such rigid and fixed support would not otherwise be possible if the hole edges were not devoid of cracks, chipping or any other form of raggedness, a factor this invention is intended to eliminate.

FIGURE 5 shows a sandblast nozzle 30 with a formed end hole 31 for production purposes which would be used in place of the template arrangement shown in FIGURE 3, to produce the hole 32 in the glass panel.

Other changes and modifications in the method as embodied in the invention disclosed herein may be made without detracting or changing the scope thereof.

Having described the invention what is claimed is:

1. In the fabrication of cathode-ray tubes having arcuate glass panels a sandblast process for drilling holes through the said arcuate panels comprising cleaning the glass surface in the area to be drilled, drilling a hole partially through the glass surface to a depth intermediate the opposite surface and simultaneously cooling the drilled surface with a fluid cooling medium, coating the opposite surface with a thermoplastic resin film to protect the said surface from scratches during sandblast, securing a template having an aperture therethrough on the said opposite surface so that the said aperturei s in axial alignment with the said hole, sandblasting the opposite surface through the said aperture to form a hole completely through the glass panel free of any cracks or chipping.

2. In the fabrication of cathode-ray tubes having arcuate glass panels a sandblast process for drilling holes through the said arcuate panels comprising cleaning the glass surface in the area to be drilled of all foreign impediments or matter, drilling a hole by means of a core drill having an abrasive tip partially through the glass surface to a depth intermediate the opposite surface and before any deformation thereof and simultaneously cooling the drilled surface with a fluid cooling medium, coating the opposite surface with a thermoplastic resin film to protect the said surface from scratches during bandblast, securing a metal backing template having an aperture therethrough on the said opposite surface so that the said aperture is in axial alignment with the said hole, sandblasting in a circulatory manner the said opposite surface through the said aperture and its periphery to form a hole completely through the glass panel free of any crack or chipping.

3. In the fabrication of cathode-ray tubes having curved surface glass panels a process for drilling holes through the said curved surface glass panels comprising cleaning the glass surface in the area to be drilled of all foreign impediments or matter, drilling a hole by means of a core drill having an abrasive tip partially through the glass surface to a depth intermediate the opposite surface and before any deformation thereof and simultaneously cooling the drilled surface with a fluid cooling medium, coating the opposite surface with a formed polystyrene shell for protective purposes, placing a hardened steel backing template having an aperture therethrough on the said opposite surface and over the coating so that the aperture is in axial alignment with the said hole, sandblasting in a slow circumferential manner the said opposite surface through the said aperture about the periphery thereof to form a hole completely through the glass panel free of any cracks or chipping.

4. In the fabrication of glass articles from curved surface glass panels according to claim 3 wherein the fluid cooling medium is water.

5. In the fabrication of glass articles from curved surface glass panels a process for drilling holes therethrough comprising cleaning the glass surface in the area to be drilled of all foreign impediments or matter, drilling a hole by means of a core drill having an abrasive tip partially through the glass surface to a depth intermediate the opposite surface and before any deformation thereof, coating the opposite surface with a formed polystyrene shell for protective purposes, sandblasting the opposite surface in the area of the drill hole by means of a sandblast gun having a fixed nozzle with a preformed aperture the size of the hole to be drilled so as to concentrate the blast sand eminating from the preformed nozzle aperture in the area of the drilled hole to form a hole through the glass panel devoid of any cracks or chips about the periphery and edges thereof.

References Cited in the file of this patent

UNITED STATES PATENTS

| | | |
|---|---|---|
| 495,000 | Evans | Apr. 4, 1893 |
| 1,276,683 | Northwood | Aug. 20, 1918 |
| 1,825,277 | Lytle | Sept. 29, 1931 |
| 1,826,625 | Masters | Oct. 6, 1931 |
| 2,092,083 | Ogle et al. | Sept. 7, 1937 |
| 2,413,084 | Sommer et al. | Dec. 24, 1946 |
| 2,671,978 | Brusetti | Mar. 16, 1954 |

FOREIGN PATENTS

| | | |
|---|---|---|
| 21,258 | Great Britain | 1908 |